United States Patent
Wheelwright et al.

(10) Patent No.: US 11,598,422 B2
(45) Date of Patent: Mar. 7, 2023

(54) FACE SEAL FITTING HAVING A POLYIMIDE SEALING COMPONENT FOR FACILITATING A FACE SEAL

(71) Applicant: Raytheon Company, Waltham, MA (US)

(72) Inventors: Paul D. Wheelwright, Tucson, AZ (US); Stephen Mayhugh, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 119 days.

(21) Appl. No.: 17/005,122

(22) Filed: Aug. 27, 2020

(65) Prior Publication Data

US 2022/0065349 A1    Mar. 3, 2022

(51) Int. Cl.
*F16J 15/3284* (2016.01)

(52) U.S. Cl.
CPC .................. *F16J 15/3284* (2013.01)

(58) Field of Classification Search
CPC .......... F16J 15/3284; F16J 15/02; F16J 15/06; F16J 15/14; F16L 23/16; F16L 23/162; F16L 23/18; F16L 23/22
See application file for complete search history.

(56) References Cited

U.S. PATENT DOCUMENTS

| | | | |
|---|---|---|---|
| 4,570,981 A * | 2/1986 | Fournier | F16L 19/0218 285/354 |
| 5,217,261 A * | 6/1993 | DeWitt | F16L 19/10 29/520 |
| 10,094,494 B2 * | 10/2018 | Norman | A61M 39/12 |
| 2008/0054635 A1 * | 3/2008 | Skiba | F16L 21/035 285/332.1 |
| 2008/0272550 A1 * | 11/2008 | Topping | F16L 19/041 277/626 |
| 2011/0121566 A1 * | 5/2011 | Cowell | F16L 19/0218 285/354 |
| 2016/0377203 A1 * | 12/2016 | Norman | A61M 39/00 285/382.7 |
| 2019/0040979 A1 * | 2/2019 | Shemtov | H02G 3/06 |

FOREIGN PATENT DOCUMENTS

| | | | | |
|---|---|---|---|---|
| CA | 2829660 A1 * | 4/2014 | | F16L 19/065 |
| CN | 104633324 A * | 5/2015 | | F16L 19/0212 |

OTHER PUBLICATIONS

Swagelok VCO O-Ring Face Seal Fittings catalog, Jul. 9, 2020, p. 3 (Year: 2020).*

* cited by examiner

*Primary Examiner* — Gilbert Y Lee

(57) ABSTRACT

A face seal fitting operable to join first and second conduits together and to provide a face seal, the face seal fitting comprising a body comprising a fluid passageway, and a coupling portion having an end defining a mating face; a gland comprising a fluid passageway, and an end having a mating face operable to be seated against the mating face of the body; a polyimide sealing component configured to be situated between the body and the gland; and a compression nut fittable over the gland and coupleable to the body, the compression nut being operable, upon torqueing to achieve a threshold compression load, to cause the mating face of the gland to seat against the mating face of the body, and to compress and elastically deform the polyimide sealing component to be flush with the mating faces of the body and the gland to form a face seal.

16 Claims, 4 Drawing Sheets

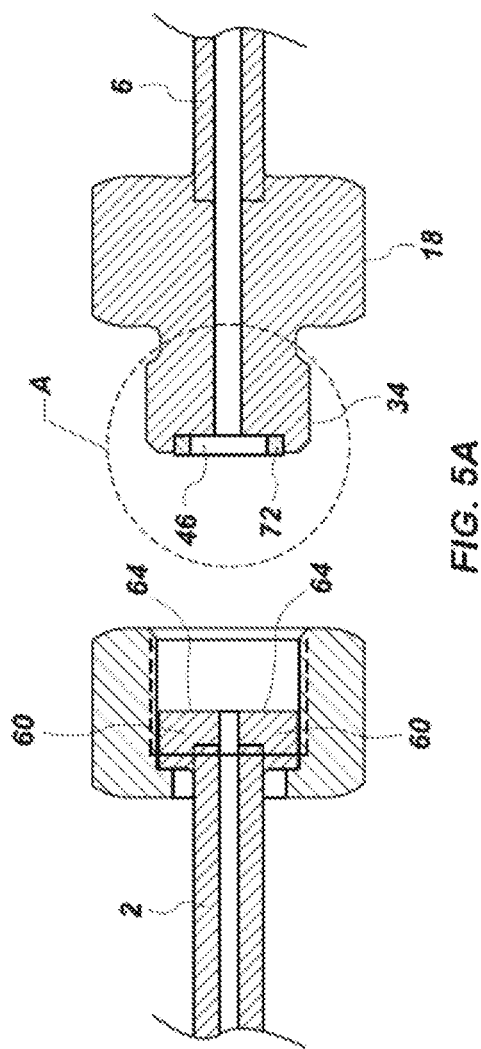
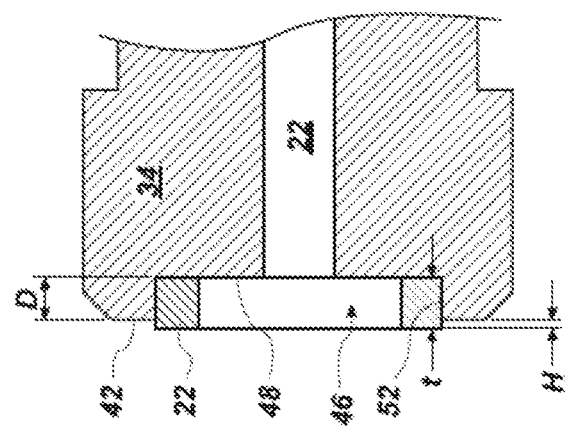
FIG. 5A
FIG. 5B

FACE SEAL FITTING HAVING A POLYIMIDE SEALING COMPONENT FOR FACILITATING A FACE SEAL

BACKGROUND

Face seals are a common type of seal comprising sealing surfaces normal to the axis of the seal. Face seals are typically formed for the purpose of sealing sections of tubing or conduits connected together. The tubing or conduits can be used to convey a fluid, such as a gas, a liquid, or a combination of these under pressure. Face seals can be formed or provided in such applications to prevent leakage in the radial direction with respect to the axis of the seal. In one example, face seals can be achieved using face seal fittings, which can comprise face seal fitting components or connectors in support of the tubing sections that can be coupled or connected together under compression loads to form the face seal. In another example, face seals can be achieved using coupleable components that are part of the conduit sections, such as two flange sections on two respective pipes that couple together to form a pipe flange joint.

Face seal fittings (or joints) can utilize various types of seals or sealing components to achieve the face seal. Elastomeric sealing components, such as O-rings, gaskets, etc. are one example of a type of seal or sealing component used to facilitate the formation of a face seal. However, elastomeric seals are susceptible to explosive decompression when subject to rapid pressure reduction. In addition, elastomeric sealing components, depending upon their type, can introduce non-volatile residue (NVR) and outgas in applications with high cleanliness and purity requirements. These types of sealing components can further require an internal support wall or groove in order to prevent extrusion under a vacuum in some applications. In another example, face seal fittings (or other types of coupleable components) can utilize metallic crush sealing components to facilitate the formation of a face seal. This type of sealing component comprises a sacrificial gasket that is intended to be crushed (i.e., plastically deformed) with little elastic rebound. As such, metallic crush sealing components are typically used only in single-use applications. In other words, metallic crush seals are not suitable for reuse, such as in applications where the face seal fitting may be disconnected and reconnected for whatever reason. In still another example, face seal fittings (or other types of coupleable components) can utilize metallic compression sealing components to facilitate the formation of a face seal. However, these are susceptible to sealing surface galling, thus limiting the number of repeatable connections/disconnections (i.e., makes/breaks) of the face seal fitting. Moreover, face seal fittings using these types of sealing components are prone to leaks when the face seal connector components are over or under torqued relative to one another.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 5A illustrates a cross-sectional side view of the face seal fitting system of FIG. 1, with the face seal fitting disconnected.

FIG. 5B illustrates a detailed cross-sectional side view of the face seal fitting system of FIG. 1, taken along Section A of FIG. 5A.

Figure 1:
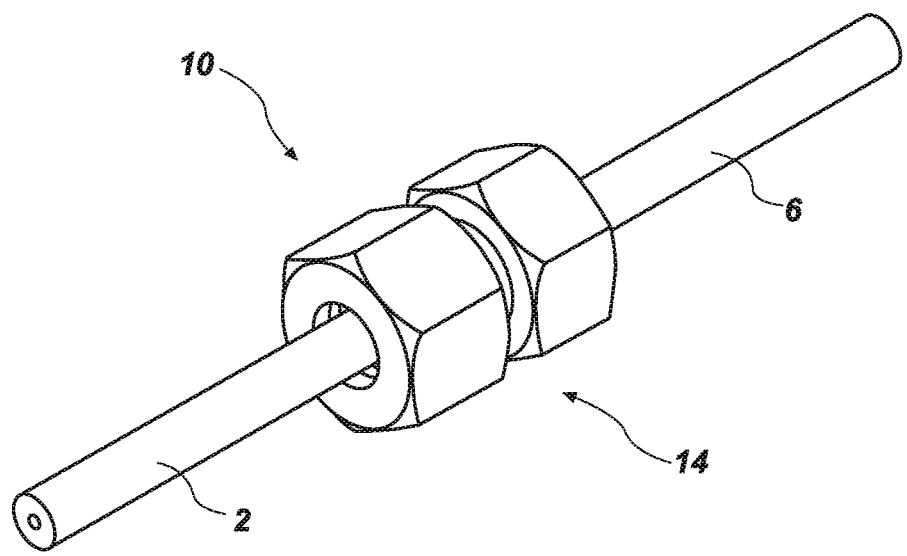
FIG. 1 illustrates an isometric view of a face seal fitting system comprising a face seal fitting operable to connect first and second conduits together, and to form a face seal between these, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "face seal" is intended to mean the type of seal formed or provided by a face seal fitting or other type of coupleable components (e.g., the two flanges used to form a pipe flange joint). Indeed, "face seal" is intended to mean the type of seal formed when opposing mating surfaces or faces of two coupling components are brought into contact, with a sealing component situated between these. The term "sealing component" is used herein to describe the physical or structural object supported between the coupleable components, such as that used within a face seal fitting, to facilitate the formation of the face seal sealing the junction between the mating faces or surfaces of the coupleable components.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a face seal fitting operable to join first and second conduits together and to provide a face seal, the face seal fitting comprising a body comprising a fluid passageway, and a coupling portion having an end defining a mating face formed normal to an axis of the fluid passageway; a gland comprising a fluid passageway configured to be aligned with the fluid passageway of the body, the gland further comprising an end having a mating face operable to be seated against the mating face of the body; a polyimide sealing component comprising an opening configured to be aligned with the fluid passageways of the body and the gland, the polyimide sealing component being configured to be situated between the body and the gland; and a compression nut fittable over the gland and coupleable to the body, the compression nut being operable, upon torqueing to achieve a threshold compression load, to cause the mating face of the gland to seat against the mating face of the body, and to compress and elastically deform at least a portion of the polyimide sealing component to be flush with the mating faces of the body and the gland to form a face seal.

In one example, at least one of the end of the body or the end of the gland comprises a counter bore formed in at least a portion thereof, wherein the polyimide sealing component is configured to be seated within the counter bore.

In one example, the counter bore is in fluid communication with the fluid passageway of the body.

In one example, the counter bore comprises a receiving surface and a sidewall orthogonal to the receiving surface.

In one example, the counter bore comprises a receiving surface and a sidewall transverse to the receiving surface.

In one example, the polyimide sealing component comprises a thickness greater than a depth of the counter bore when seated against a receiving surface of the counter bore and when retained within the counter bore, such that a portion of the polyimide sealing component extends above the mating face prior to the compression of the polyimide sealing component and the formation of the face seal.

In one example, the face seal fitting further comprises a plastic deformation stage, wherein the polyimide sealing component is configured to plastically deform under application of an initial installation compression load achieved by torqueing of the compression nut, and an elastic deformation stage, wherein the polyimide sealing component is configured to elastically deform under operating compression loads applied subsequent to the initial installation compression load by torqueing of the compression nut sufficient to mate the mating faces of the receiving body and the gland and to form the face seal.

In one example, the polyimide sealing component is sized and configured to seat against a receiving surface of the counter bore, and to engage and interface with the wall of the counter bore upon undergoing plastic deformation, thus retaining the polyimide sealing component in the counter bore.

In one example, the polyimide sealing component is sized and configured so as to be press fit into the counter bore, thus retaining the polyimide sealing component in the counter bore.

The present disclosure also sets forth a face seal connection system for facilitating a face seal connection between first and second conduits. The face seal connection system can comprise a first connection component comprising a fluid passageway, and an end defining a mating face formed normal to an axis of the fluid passageway; a second connection component securable to the first connection component, the second connection component comprising a fluid passageway configured to be aligned with the fluid passageway of the first connection component, the second connection component further comprising an end defining a mating face operable to be seated against the mating face of the first connection component; and a polyimide sealing component comprising an opening configured to be aligned with the fluid passageways of the first and second connection components, the polyimide sealing component being configured to be situated between the first and second connection components, wherein, upon the first and second connection components being subject to a threshold compression load, the mating faces of the first and second connection components are caused to seat, and the polyimide sealing component is caused to compress and elastically deform to form a face seal.

In one example, the first connection component can comprise a body of a face seal fitting, and wherein the second connection component can comprise a nut of the face seal fitting fittable onto the body.

In one example, the first connection component can comprise a body of a face seal fitting, and wherein the second connection component can comprise a gland of the face seal fitting, the face seal fitting further comprising a compression nut operable to secure the gland to the body.

In one example, the first connection component can comprise a first flange supported at an end of the first conduit, and wherein the connection component can comprise a second flange supported at an end of the second conduit, the face seal connection system further comprising one or more fasteners operable to secure the first and second flanges together under compression.

In one example, one of the first connection component or the second connection component can comprise a counter bore formed in at least a portion of an end thereof, and wherein the polyimide sealing component is configured to be seated within the counter bore.

In one example, at least a portion of the polyimide sealing component configured to be seated within the counter bore is configured to plastically deform to facilitate securing of the polyimide sealing component within the counter bore.

In one example, at least a portion of the polyimide seal is configured to elastically deform under the threshold compression load to facilitate repeated connection and disconnection of the face seal connection system.

The present discourse still sets forth a face seal connection comprising a first conduit; a second conduit; a face seal connection system supported about and fluidly connecting the first and second conduits and forming a face seal, the face seal connection system comprising a first connection component supported on the first conduit comprising a fluid passageway, and an end defining a mating face formed normal to an axis of the fluid passageway; a second connection component supported on the second conduit and securable to the first connection component, the second connection component comprising a fluid passageway aligned with the fluid passageway of the first connection component, the second connection component further comprising an end defining a mating face seated against the mating face of the first connection component; a polyimide sealing component comprising an opening aligned with the fluid passageways of the first and second connection components, the polyimide sealing component situated between the first and second connection components, wherein, with the first and second connection components under a threshold compression load, the polyimide sealing component is compressed and elastically deformed as part of the face seal.

In one example, the face seal connection system is configured to undergo repeated connection and disconnection using the same polyimide sealing component.

The present disclosure still sets forth a method for facilitating formation of a face seal within a connection system. The method can comprise configuring a first connection component to comprise a fluid passageway, and an end defining a mating face formed normal to an axis of the fluid passageway; configuring a second connection component to be securable to the first connection component, and to comprise a fluid passageway configured to be aligned with the fluid passageway of the first connection component, the second connection component further being configured to comprise an end defining a mating face operable to be seated against the mating face of the first connection component; providing a polyimide sealing component comprising an opening configured to be aligned with the fluid passageways of the first and second connection components, the polyimide sealing component being configured to be situated between the first and second connection components: and configuring the mating faces of the first and second connection components to seat and the polyimide sealing component to compress and elastically deform under a threshold compression load applied between the first and second connection components, so as to be flush with the mating faces, and to form a face seal.

In one example, the method can further comprise configuring one of the first or second connection components to comprise a counter bore formed in an end thereof, and configuring the counter bore to receive and to secure a portion of the polyimide sealing component.

Figure 2:
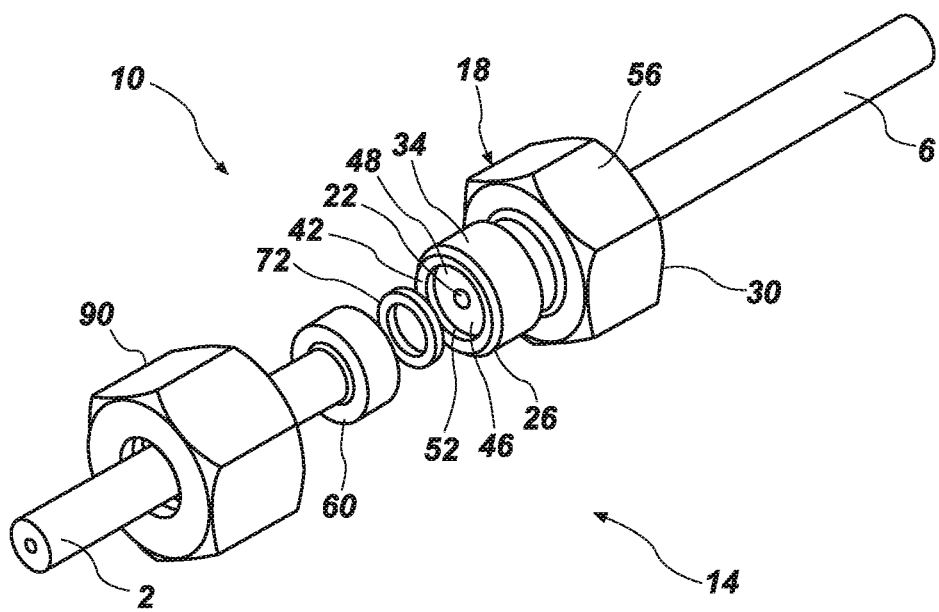
FIG. 2 illustrates an isometric exploded view of the face seal fitting system of FIG. 1.
Figure 3:
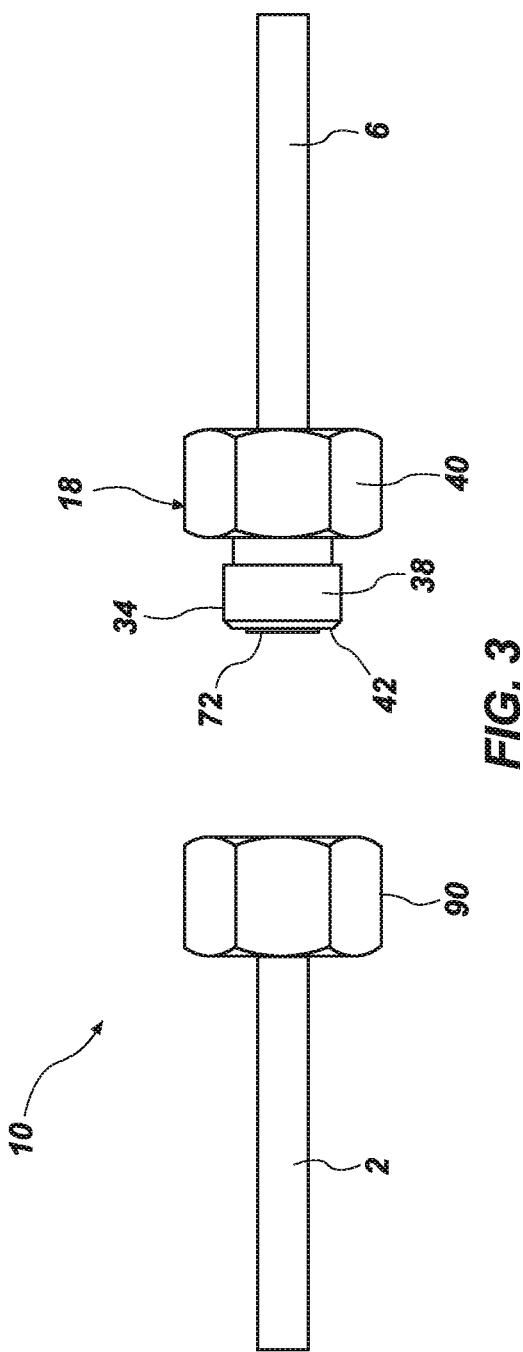
FIG. 3 illustrates a side view of the face seal fitting system of FIG. 1, with the face seal fitting disconnected.
Figure 4:
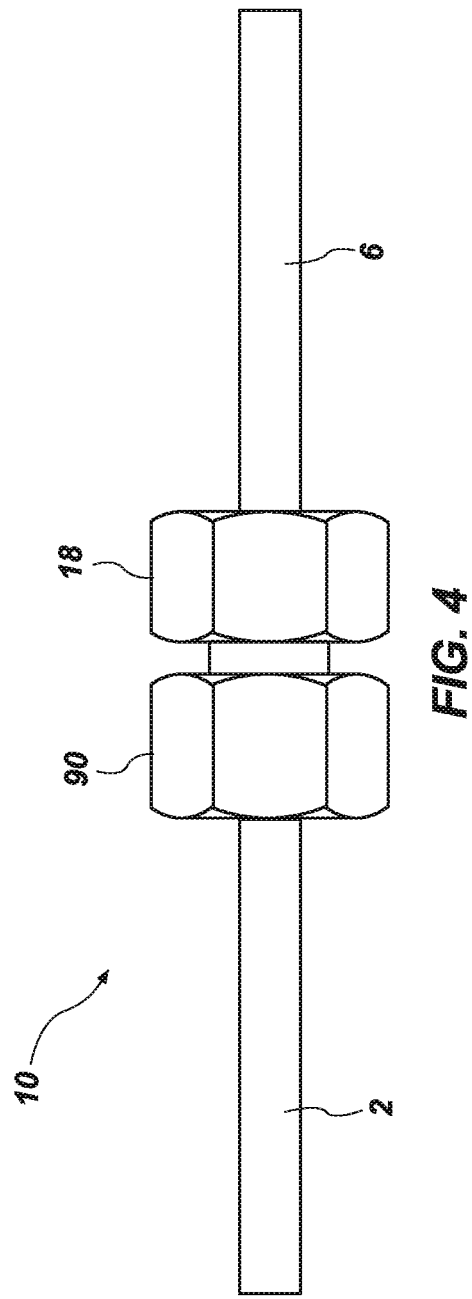
FIG. 4 illustrates a side view of the face seal fitting system of FIG. 1, with the face seal fitting connected.
Figure 6:
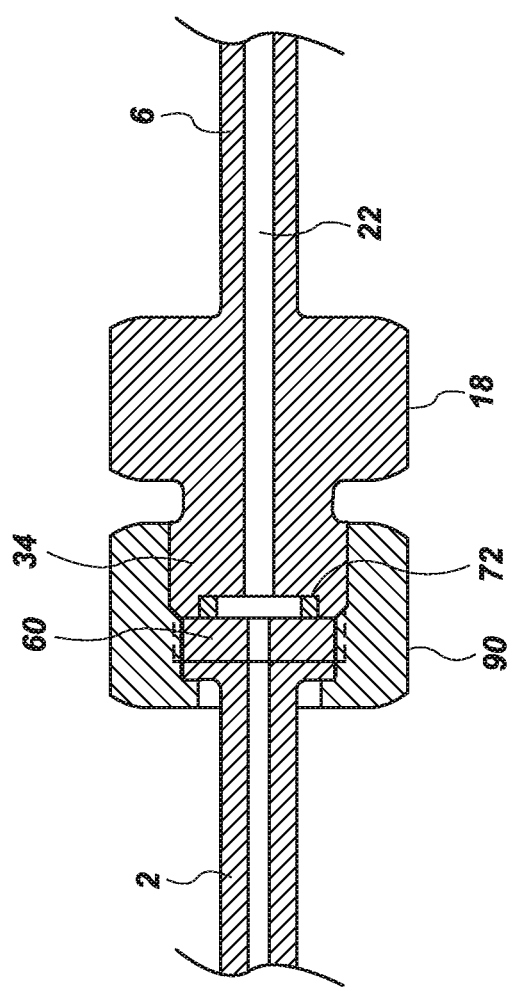
FIG. 6 illustrates a cross-sectional side view of the face seal fitting system of FIG. 1, with the face seal fitting connected.

To further describe the present technology, examples are now provided with reference to the figures. With reference to FIGS. 1-6, disclosed is a face seal connection 10 comprising a face seal connection system connecting a first conduit 2 and a second conduit 6 and providing a face seal. Generally speaking, the face seal connection system can comprise a first connection component. This can be either of the body or the gland in the example discussed below. The first connection component can comprise a fluid passageway, and an end defining a mating face formed normal to an axis of the fluid passageway. The face seal connection system can further comprise a second connection component securable to the first connection component. This can be the other of the gland or the body discussed below. The second connection component can comprise a fluid passageway configured to be aligned with the fluid passageway of the first connection component, the second connection component further comprising an end defining a mating face operable to be seated against the mating face of the first connection component.

The term "face seal connection system" is intended to generically refer to different types of face seal connection systems. For example, one type of face seal connection system can comprise a face seal fitting. Another type of face seal connection system can comprise a flange joint. Similarly, the term "first connection component" is intended to generically refer to the first component in a face seal connection system, and is intended to include different types of connection components. For example, a first connection component can comprise a body in a face seal fitting. In another example, a first connection component can comprise a first flange in a flange joint. Likewise, the term "second connection component" is intended to generically refer to the second component in a face seal connection system, and is intended to include different types of connection components. For example, a second connection component can comprise a gland or a nut that mates with a body in a face seal fitting. In another example, a second connection component can comprise a second flange that mates with a first flange to form a flange joint.

The face seal connection system 14 can further comprise a polyimide sealing component (which can also be referred to as a polyimide gasket) comprising a body structure defining an opening configured to be aligned with the fluid passageways of the first and second connection components, the polyimide sealing component being configured to be situated between the first and second connection components. As will be discussed in greater detail below, upon the first and second connection components being subject to a threshold compression load, the mating faces of the first and second connection components are caused to seat, and the polyimide sealing component is caused to compress and elastically deform to form the face seal.

The face seal connection system 14 can further comprise a counter bore formed in an end portion of either of the first or second connection components. The counter bore can be sized and configured to receive, and to have seated therein, the polyimide sealing component. The counter bore can comprise a receiving surface and a sidewall, the receiving surface being located or formed at a depth that is less than a thickness of the polyimide sealing component, such that a portion of the polyimide sealing component protrudes or extends above the mating face formed about or circumscribing the counter bore.

Although it is contemplated that the face seal connection system can comprise many different types, designs, and configurations (e.g., face seal fitting, flange joint, and others as will be recognized by those skilled in the art), in the specific example of FIGS. 1-6, the face seal connection system comprises a face seal fitting 14 as part of a face seal connection 10 in accordance with an example of the present disclosure. The example of a face seal fitting is used herein to describe in detail the features and advantages of the present disclosure, it being understood by those skilled in the art that similar features and advantages can be applied to different types of face seal connection systems although these are not specifically discussed herein.

With reference to FIGS. 1-6, the face seal connection 10 can comprise a face seal fitting 14 in support of the first conduit 2 and the second conduit 6, where the face seal fitting 14 functions to fluidly connect together the first conduit 2 and the second conduit 6, thus facilitating fluid flow through the first and second conduits 2 and 6, respectively. It is noted that here are many different types of face seal fittings that can be manufactured using the technology and concepts discussed herein. Indeed, it is contemplated that the face seal fitting 14 can comprise any type of fitting utilizing or providing a face type of seal between the components of the face seal fitting. As such, the face seal fitting 14 described herein and shown in the drawings is not intended to be limiting in any way. In one specific example, the face seal fitting 14 can comprise a vacuum coupling type of fitting similar to an elastomeric or metal O-ring face seal type of fitting or a metallic crush face seal type of fitting, the difference being that the vacuum coupling type of fitting utilizing the present technology and concepts would comprise a polyimide sealing component rather than an O-ring, as well as comprising other features as described herein. These are examples of face seal fittings for high pressure applications (high pressure applications referring to applications in which the operating pressures are up to 10,000 psi with safety qualified to 40,000 psi), such as cryogenic applications. However, the present technology is not limited to high pressure applications. Indeed, the face seal fitting 14 can comprise any type of face seal fitting to be used in a variety of applications where operating pressures are lower than the high pressures identified above.

The term "conduit" is intended to mean, and can comprise, any type of tube, pipe or other device/structure suitable for carrying fluid, particularly under pressure. A conduit can be made of any suitable material or combination of materials, such as metal or metal alloy (e.g., steel, copper, iron, aluminum, etc.), plastic (e.g., polyvinyl chloride (PVC), cross-linked polyethylene (PEX), rubber, etc.), or any others depending upon the particular application. Specific types of conduits can include those for high pressure and/or low temperature applications, such as vacuum jacketed conduits used in cryogenic applications. As pertaining to the first and second conduits 2 and 6, the term "fluidly connect" is intended to mean that the first and second conduits 2 and 6 are connected in a manner such that fluid is able to flow between them through the connection joint formed and provided by the face seal fitting 14.

The face seal fitting 14 can comprise a body 18 supported on and operable with the second conduit 6, a gland 60 supported on and operable with the first conduit 2, a polyimide sealing component 72, and a compression nut 90. The body 18 can comprise a fluid passageway 22 oriented axially along a longitudinal axis of the body 18 and extending through the body from a first end 26 to a second end 30. The fluid passageway 22 can be in fluid communication with the first and second conduits 2, 6, so as to facilitate fluid flow through the body 18 and within the first and second conduits 2, 6. The fluid passageway 22 can comprise any size and configuration as needed for a given application. Moreover, the fluid passageway 22 can be formed in the body 18 so as to be aligned with the first and second conduits 2, 6. The body 18 can further comprise a coupling portion 34 defining the first end 30. The coupling portion 34 can comprise a nut interface 38 formed on a surface. In one example, the nut interface 38 can comprise a series of threads (not shown) formed on the outer surface of the coupling portion 34 that are complementary to a series of threads formed on the nut 90. In this example, the body 18 can comprise a fixed male body, with the coupling portion 34 comprising the nut interface 38 formed on the outer surface of the coupling portion 34, the body 18 being operable with the nut 90, which, in this example, can comprise a rotatable female compression nut. The coupling portion 34 can further comprise a mating face 42 formed in the end 26 and oriented along a plane normal to the axis of the fluid passageway 22. The mating face 42 can comprise a flat surface configuration formed in accordance with a given tolerance. The mating face 42 can comprise an annular ring-shape or configuration. It is noted that, in another example, the body 18 can comprise a fixed female body, or a rotating body (male or female).

The coupling portion 34 can still further comprise a counter bore 46 formed in the end 26. The counter bore 46 can be formed to be adjacent the mating face 42. More specifically, the counter bore 46 can comprise a receiving surface 48 and a sidewall 52 defining the size and configuration of the counter bore 46. In one example, the sidewall 52 can be formed so as to be orthogonal to the receiving surface 48. In another example, the sidewall 52 can be formed so as to be oriented on an incline other than orthogonal to the receiving surface 48, but still transverse to the receiving surface 48. For example, the sidewall 52 can be configured as a dovetail configuration with the cross-sectional area of the counter bore 46 increasing with the depth of the counter bore 46 relative to the mating face 42.

The depth of the counter bore 46 can be less than a thickness of the polyimide sealing component 72. The counter bore 46 can be in fluid communication with the fluid passageway 22. In other words, the counter bore 46 can be formed as a recess defined only by the receiving surface 48 and the sidewall 52, thus being configured differently than a groove having inner and outer sidewalls that define, at least in part, the groove as in conventional face seal fittings. The sidewall 52 can extend inward (towards the second end 30 of the body 18) from an edge of the mating face 42. As such, the mating face 42 can comprise an annular ring configuration circumscribing the counter bore 46.

The body 18 can further comprise a hex or other similar surface 40 formed about the second end 30 adjacent the coupling portion 34 and that is configured to receive a tool or other driver (e.g., wrench) and that facilitates coupling of the body 18 to the nut 90 and torqueing the nut relative to the body 18 to induce a compression force within the face seal fitting 14.

The gland 60 can be configured to be supported about the first conduit 2 using any known devices or methods. For example, in one embodiment, the gland 60 can be configured to be operable with one or more collets or ferrules that clamp onto the conduit 2 upon initially making up the face seal fitting 14, as known in the art. Other devices and methods can be employed to support the gland about an end of the first conduit 2, as will be appreciated and recognized by those skilled in the art. The gland 60 can comprise a fluid passageway 62 extending axially all the way through the gland 60 along a longitudinal axis from a first end of the gland 60 to a second end of the gland 60, and configured to be aligned with the fluid passageway 22 of the body 18. The fluid passageway 62 can be in fluid communication with the first and second conduits 2, 6, and with the fluid passageway 22 of the body 18 so as to facilitate fluid flow through the gland 60, the body 18 and within the first and second conduits 2, 6. The gland 60 can further comprise a mating face 64 formed about an end portion of the gland 60. The mating face 64 can be sized and configured to interface with (i.e., seat against) the mating face 42 of the body 18. The gland 60 can comprise any size and configuration.

The polyimide sealing component 72 can be supported between the body and the gland 60, and can operate to facilitate the formation of the face seal, and to further prevent leakage of fluid through the face to face seating contact established between the mating face 42 of the body 18 and the mating face 64 of the gland 60. The polyimide sealing component 72 can comprise be sized and configured to be operable with the body 18 and the gland 60, and to define an opening configured to be aligned with the fluid passageways of the body 18 and the gland 60, such that fluid flows through the polyimide sealing component 72. The polyimide sealing component 72 can comprise a solid body structure having an annular ring-like configuration. In one example, the polyimide sealing component 72 can comprise a toroid configuration having a square or rectangular cross-sectional geometry defining first and second surfaces oriented along planes opposite and spaced apart from one another, and further defining both an outer perimeter sidewall, and an inner sidewall. The opposing surfaces can be spaced apart any distance to define a thickness t of the polyimide sealing component 72. The inner and outer sidewalls can be spaced apart to define a width of the annular body structure.

The polyimide sealing component 72 can comprise a variety of different polyimide makeups depending upon the application in which the face seal fitting 14 is intended for use. In one specific example, the polyimide sealing component 72 can be formed using a Vesper type of polyimide material manufactured by DuPont de Nemours, Inc. More specifically, the polyimide sealing component can be formed from Vespel® SP-1 (ASTM Delta 6456 Type I). Polyimide sealing components, such as those formed from Vespel®, provide several beneficial properties, including excellent creep resistance. In addition, polyimide sealing components, such as those formed from Vesper, do not cold flow when elastically deformed. It is contemplated that other types of polyimide materials can be used. In addition, it is contemplated that polyimide sealing components can be formed of polyimide compounds, such as those reinforced with graphite or glass fibers.

In one example, as shown in the drawings, the polyimide sealing component 72 can be received and seated in the counter bore 46 formed in the coupling portion 34 of the body 18. The polyimide sealing component 72 can comprise a thickness t greater than a depth D of the counter bore 46, such that a portion of the polyimide sealing component 72 protrudes or extends above the mating face 42 of the body 18 a height H when the face seal fitting is not subject to any compression loads (e.g., the nut 90 is not coupled to the body 18, or the nut 90 is not torqued to any degree that would force the gland 60 and the body 18 together under a compression load sufficient to compress the polyimide sealing component 72). In a specific example using a specific type of face seal fitting, and not intending to be limiting in any way, the counter bore 46 can comprise a depth ranging between 0.045 and 0.047 inches. The diameter of the counter bore 46 can range between 0.376 and 0.378 inches. The outer diameter of the polyimide sealing component can range between 0.373 and 0.375 inches. The inner diameter of the polyimide sealing component can range between 0.259 and 0.269 inches. The thickness t of the polyimide sealing component can range between 0.058 and 0.060 inches. It is noted that the counter bore 46 can instead be formed in the end of the gland. This example is not shown or described in detail, but will be apparent to those skilled in the art, and is contemplated herein.

The compression nut 90 can be configured to be coupled to the body 18, and operable, upon being coupled to the body 18 and torqued, to compress the polyimide sealing component 72, and to cause the mating surface 64 of the gland 60 to seat against the mating surface 42 of the body 18 to form a face seal. The compression nut 90 can comprise a male or a female configuration, and can be fixed or rotatable. Likewise, the body 18 can comprise a male or female configuration, and can also be fixed or rotatable. Therefore, the specific configurations of the body 18 and the nut 90 (and the gland 60) shown in the drawings and discussed herein are not intended to be limiting in any way as those skilled in the art will recognize that the technology and concepts discussed herein are applicable to both male and female type of face seal fitting components.

The polyimide sealing component 72 can be retained or secured within the counter bore 46 in a variety of ways, depending upon the intended use and operating environment of the face seal fitting 14. In one example, such as for high pressure applications, at least a portion of the polyimide sealing component 72 can be plastically deformed under a load sufficient to force it to expand into and conform to the configuration of the counter bore 46. The plastic deformation can be to such a degree so as to retain the polyimide sealing component 72 within the counter bore 46. In this example, the face seal fitting 14 can comprise a plastic deformation stage and an elastic deformation stage. Indeed, prior to an initial make-up of the face seal fitting 14 where the gland 60 is positioned adjacent the body 18 and the nut 90 is fitted over the gland 60 and coupled to the body 18 to secure the gland 60 in place, and prior to the polyimide sealing component 72 being compressed, the polyimide sealing component 72 can be inserted into the counter bore 46 and seated against the receiving surface 48. At this point, the polyimide sealing component 72 is not secured and can be easily removed from the counter bore 46. The nut 90 can then be torqued (i.e., tightened) to generate a compression load within the face seal fitting 14 sufficient to draw the gland 60 into the body 18. The nut 90 can be further torqued a sufficient amount so as to generate a threshold compression load within the face seat fitting 14 sufficient to plastically deform at least a portion of the polyimide sealing component 72 within the counter bore 46. The threshold compression load can be any load above the yield strength of the polyimide sealing component 72, such that the portion of the polyimide sealing component 72 within the counter bore 46 permanently expands or otherwise distorts in one way or another. Moreover, the threshold load can be achieved prior to the mating face 42 of the body 18 seating against the mating face 64 of the gland 60. The polyimide sealing component 72 can be sized and configured, and the threshold compression load can be predetermined, such that the degree of plastic deformation (e.g., expansion) of the polyimide sealing component 72 would result in an outer diameter that exceeds the diameter of the counter bore 46. However, the sidewall of the counter bore 46 provides a boundary that stops or limits the degree of expansion, thus causing the portion of the polyimide sealing component 72 to expand into and conform to the counter bore 46, thus securing the polyimide sealing component 72 within the counter bore 46. This initial make-up of the face seal fitting 14 to plastically deform the polyimide sealing component 72 can be referred to as the plastic deformation stage of the face seal fitting 14. Plastic deformation of the polyimide sealing component 72 completes the plastic deformation stage. It is noted that although the polyimide sealing component 72 undergoes plastic deformation, the sizing and configuring of the polyimide sealing component 72 can be such that at least a portion of the polyimide sealing component 72 is caused to remain protruded or extended above the mating surface 42 of the body 18 after completion of the plastic deformation stage. The height H of the polyimide sealing component 72 above the mating surface 42 will likely decrease following the plastic deformation stage as compared to the height H prior to the plastic deformation stage. It is further noted that the initial make-up of the face seal fitting 14 to achieve plastic deformation of the polyimide sealing component 72 can be carried out with the face seal fitting 14 in use with first and second conduits 2, 6, or this can take place without the face seal fitting 14 coupled to any conduits.

Following the initial make-up of the face seal fitting 14 and the completion of the plastic deformation stage, the face seal fitting 14 operates in an elastic deformation stage for normal operating conditions, including repeated make-up and break-up of the face seal fitting 14 should this be necessary. Following the plastic deformation stage, the nut 90 can be loosened to break-up or disassemble the face seal fitting 14. The nut 90 can be loosened and/or removed and the gland 60 separated from the body 18. However, the polyimide sealing component 72 is inseparable from the body 18, it being securely retained within the counter bore 46. In the elastic deformation stage, the face seal fitting 14 can be made-up or reassembled to provide a face seal connection between first and second conduits 2, 6. During make-up operations subsequent to the initial make-up, and with the polyimide sealing component 72 secured within the counter bore 46, the nut 90 can be fitted over the gland 60 and coupled to the body 18 to position the body 18 and the gland 60 relative to one another, and specifically to bring the mating face 42 of the body 18 and the mating face of the gland 60 into alignment. In this configuration, the portion of the polyimide sealing component 72 protruding above the mating face 42 of the body is caused to be brought into contact with and seated against the mating face 64 of the gland 60. As the nut 90 is torqued or tightened and a compression force generated within the face seal fitting 14, the gland 60 is drawn into the body 18, wherein the mating face 64 of the gland 60 compresses the polyimide sealing component 72. The nut 90 can be torqued or tightened further to further compress the polyimide sealing component 72, and to cause the mating face 42 of the body 18 to seat against the mating face 64 of the gland 60. In this positon or configuration, the polyimide sealing component 72 is compressed a distance substantially equal to the height H so as to be flush with the mating face 42 of the body 18. Although the polyimide sealing component 72 is compressed, the compression loads acting on the portion of the polyimide sealing component 72 protruding above the mating face 42 are insufficient to exceed the new yield point of the polyimide sealing component 72. As such, the polyimide sealing component 72 only undergoes elastic deformation in subsequent installations. Indeed, loosening of the nut 90 and/or breaking up or disassembling the face seal fitting 14 will result in the polyimide sealing component 72 rebounding to its previous shape.

Furthermore, the seating of the mating face 42 with the mating face 64 forms or provides a face seal within the face seal fitting 14. The integrity (i.e., leak prevention capabilities) of the formed face seal can be improved by the presence of the polyimide sealing component 72. Indeed, due to it being at least somewhat elastically deformable below its yield point, the polyimide sealing component 72, upon being compressed and caused to seat against the mating face 64, at least partially conforms to the mating surface 64, thus at least partially filling any voids existing between the seated mating faces 42, 64. The magnitude and number of voids can vary depending upon the tolerances specified for the mating faces 42, 64 for a given application.

Furthermore, with the face seal fitting 14 in use under pressure, the counter bore 46 functions to contain the polyimide sealing component 72. Specifically, the counter bore 46 provides outboard containment that prevents the polyimide sealing component 72 from radially expanding. If radial expansion of the polyimide sealing component 72 was not contained, the expansion could be significant enough such that the outboard radial growth would cause the polyimide sealing component 72 to fail. This is particularly true in high pressure applications, such as those ranging between 10,000 and 40,000 psi.

In another example, the polyimide sealing component 72 can be sized and configured so as to be press fit into the counter bore 46, thus retaining or securing the polyimide sealing component 72 within the counter bore 46. In this example, the face seal fitting 14 operates only within an elastic deformation stage as there is no plastic deformation stage. Securing the polyimide sealing component 72 in the counter bore 46 using an interference fit may be beneficial for lower pressure applications as compared to the high pressure applications where the polyimide sealing component 72 is secured in the counter bore 46 due to being plastically deformed.

The face seal fitting 14 provides several benefits, advantages and technical solutions over prior or existing face seal type of fittings or face seal connection systems. For example, one advantage is that, due to its polyimide makeup, relatively low torque is needed to compress and elastically deform the polyimide sealing component to be flush with the mating face during make-up of the face seal fitting and formation of the face seal. Indeed, the face seal fitting can be configured to form the face seal using a hand-applied torque, even for high pressure applications. Another advantage is that the face seal fitting can undergo repeated make-up and break-up operations without having to replace the polyimide sealing component. In other words, the polyimide sealing component is reusable, thus facilitating less expensive and cumbersome repairs or maintenance, and thus being reusable in different applications. Another advantage is that the polyimide sealing component is better suited for applications with high cleanliness and purity requirements as it does not does not require lubrication and does not produce measurable non-volatile residue (NVR) nor outgassing compared with traditional elastomeric sealing components, such as O-rings. Another advantage is that the polyimide sealing component effectively seals in vacuum/high pressure cycling and high temperature applications. Still other advantages will be apparent to those skilled in the art.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A face seal fitting comprising:
  a body comprising a fluid passageway, and a coupling portion having an end defining a mating face formed normal to an axis of the fluid passageway;

a gland comprising a fluid passageway configured to be aligned with the fluid passageway of the body, the gland further comprising an end having a mating face operable to be seated directly against the mating face of the body;

a polyimide sealing component comprising an opening configured to be aligned with the fluid passageways of the body and the gland, the polyimide sealing component being configured to be situated between the body and the gland; and a compression nut fittable over the gland and coupleable to the body, the compression nut being operable, upon torqueing to achieve a threshold compression load, to cause the mating face of the gland to seat directly against the mating face of the body, and to compress and elastically deform at least a portion of the polyimide sealing component to be flush with the mating faces of the body and the gland to form a face seal, wherein at least one of the end of the body or the end of the gland comprises a counter bore formed in at least a portion thereof, and wherein the polyimide sealing component is configured to be seated within the counter bore, and wherein the polyimide sealing component comprises a thickness greater than a depth of the counter bore when seated against a receiving surface of the counter bore and when retained within the counter bore, such that a portion of the polyimide sealing component extends above the mating face prior to the compression of the polyimide sealing component and the formation of the face seal.

2. The face seal fitting of claim 1, wherein the counter bore is in fluid communication with the fluid passageway of the body.

3. The face seal fitting of claim 1, wherein the counter bore comprises a receiving surface and a sidewall orthogonal to the receiving surface.

4. The face seal fitting of claim 1, wherein the counter bore comprises a receiving surface and a sidewall transverse to the receiving surface.

5. The face seal fitting of claim 1, further comprising a plastic deformation stage, wherein the polyimide sealing component is configured to plastically deform under application of an initial installation compression load achieved by torqueing of the compression nut, and an elastic deformation stage, wherein the polyimide sealing component is configured to elastically deform under operating compression loads applied subsequent to the initial installation compression load by torqueing of the compression nut sufficient to mate the mating faces of the receiving body and the gland and to form the face seal.

6. The face seal fitting of claim 5, wherein the polyimide sealing component is sized and configured to seat against a receiving surface of the counter bore, and to engage and interface with the wall of the counter bore upon undergoing plastic deformation, thus retaining the polyimide sealing component in the counter bore.

7. The face seal fitting of claim 1, wherein the polyimide sealing component is sized and configured so as to be press fit into the counter bore, thus retaining the polyimide sealing component in the counter bore.

8. A face seal connection system for facilitating a face seal connection between first and second conduits, the face seal connection system comprising:

a first connection component comprising a fluid passageway, and an end defining a mating face formed normal to an axis of the fluid passageway;

a second connection component securable to the first connection component, the second connection component comprising a fluid passageway configured to be aligned with the fluid passageway of the first connection component, the second connection component further comprising an end defining a mating face operable to be seated directly against the mating face of the first connection component;

a polyimide sealing component comprising an opening configured to be aligned with the fluid passageways of the first and second connection components, the polyimide sealing component being configured to be situated between the first and second connection components, wherein, upon the first and second connection components being subject to a threshold compression load, the mating faces of the first and second connection components are caused to seat directly against each other, and the polyimide sealing component is caused to compress and elastically deform to form a face seal, and wherein one of the first connection component or the second connection component comprises a counter bore formed in at least a portion of an end thereof, and wherein the polyimide sealing component is configured to be seated within the counter bore, the polyimide sealing component being sized and configured to extend above the mating face prior to the compression of the polyimide sealing component and the formation of the face seal.

9. The face seal connection system of claim 8, wherein the first connection component comprises a body of a face seal fitting, and wherein the second connection component comprises a nut of the face seal fitting fittable onto the body.

10. The face seal connection system of claim 8, wherein the first connection component comprises a body of a face seal fitting, and wherein the second connection component comprises a gland of the face seal fitting, the face seal fitting further comprising a compression nut operable to secure the gland to the body.

11. The face seal connection system of claim 8, wherein the first connection component comprises a first flange supported at an end of the first conduit, and wherein the connection component comprises a second flange supported at an end of the second conduit, the face seal connection system further comprising one or more fasteners operable to secure the first and second flanges together under compression.

12. The face seal connection system of claim 8, wherein at least a portion of the polyimide sealing component configured to be seated within the counter bore is configured to plastically deform to facilitate securing of the polyimide sealing component within the counter bore.

13. The face seal connection system of claim 8, wherein at least a portion of the polyimide seal is configured to elastically deform under the threshold compression load to facilitate repeated connection and disconnection of the face seal connection system.

14. A face seal connection comprising:
a first conduit;
a second conduit;
a face seal connection system supported about and fluidly connecting the first and second conduits and forming a face seal, the face seal connection system comprising:

a first connection component supported on the first conduit comprising a fluid passageway, and an end defining a mating face formed normal to an axis of the fluid passageway;

a second connection component supported on the second conduit and securable to the first connection component, the second connection component comprising a fluid passageway aligned with the fluid passageway of the first connection component, the second connection component further comprising an end defining a mating face operable to be seated directly against the mating face of the first connection component;

a polyimide sealing component comprising an opening aligned with the fluid passageways of the first and second connection components, the polyimide sealing component situated between the first and second connection components, wherein, with the first and second connection components under a threshold compression load, the mating faces of the first and second connection components are caused to seat directly against each other, and the polyimide sealing component is compressed and elastically deformed as part of the face seal, wherein one of the first connection component or the second connection component comprises a counter bore formed in at least a portion of an end thereof, and wherein the polyimide sealing component is configured to be seated within the counter bore, the polyimide sealing component being sized and configured to extend above the mating face prior to the compression of the polyimide sealing component and the formation of the face seal.

15. The face seal fitting system of claim 14, wherein the face seal connection system is configured to undergo repeated connection and disconnection using the same polyimide sealing component.

16. A method for facilitating formation of a face seal within a connection system, the method comprising:

configuring a first connection component to comprise a fluid passageway, and an end defining a mating face formed normal to an axis of the fluid passageway;

configuring a second connection component to be securable to the first connection component, and to comprise a fluid passageway configured to be aligned with the fluid passageway of the first connection component, the second connection component further being configured to comprise an end defining a mating face operable to be seated directly against the mating face of the first connection component;

providing a polyimide sealing component comprising an opening configured to be aligned with the fluid passageways of the first and second connection components, the polyimide sealing component being configured to be situated between the first and second connection components;

configuring the mating faces of the first and second connection components to seat directly against each other, and the polyimide sealing component to compress and elastically deform under a threshold compression load applied between the first and second connection components, so as to be flush with the mating faces, and to form a face seal; and configuring one of the first connection component or the second connection component to comprise a counter bore formed in at least a portion of an end thereof, wherein the polyimide sealing component is configured to be seated within the counter bore, the polyimide sealing component being sized and configured to extend above the mating face prior to the compression of the polyimide sealing component and the formation of the face seal.

* * * * *